United States Patent [19]

Ionescu

[11] 4,148,390
[45] Apr. 10, 1979

[54] BOTTLE-CONVEYING APPARATUS

[75] Inventor: Alexandru D. Ionescu, Fairfield, Conn.

[73] Assignee: New England Machinery, Inc., Bridgeport, Conn.

[21] Appl. No.: 819,601

[22] Filed: Jul. 27, 1977

[51] Int. Cl.² .......................................... B65G 47/24
[52] U.S. Cl. .................................. 198/400; 198/399; 221/171
[58] Field of Search ............... 198/604, 605, 626, 399, 198/400, 627; 271/184; 221/171–173

[56] References Cited

U.S. PATENT DOCUMENTS

| | | | |
|---|---|---|---|
| 3,124,231 | 3/1964 | Ott | 198/604 X |
| 3,203,534 | 8/1965 | Burkhardt et al. | 198/399 |
| 3,580,375 | 5/1971 | Nones | 198/627 X |
| 3,682,292 | 8/1972 | Drew | 198/399 |
| 3,894,628 | 7/1973 | Pugh et al. | 198/407 |

FOREIGN PATENT DOCUMENTS 2414537  10/1974  Fed. Rep. of Germany ........... 198/399

*Primary Examiner*—John J. Love
*Assistant Examiner*—Douglas D. Watts
*Attorney, Agent, or Firm*—Jack Posin

[57] ABSTRACT

Apparatus for conveying bottles is disclosed, the apparatus comprising a rotationally mobile arrangement of parts for frictionally gripping the opposite sides of each of a plurality of bottles advanced thereto in succession and rotatably advancing such bottles in a downstream direction, a linearly mobile arrangement of parts for frictionally gripping the opposite sides of bottles advanced thereto in succession by the rotationally mobile arrangement of parts and linearly advancing such bottles further downstream to, for example, bottle-processing equipment; and an arrangement of bottle ejecting and bottle directing parts interposed between the rotationally mobile arrangement of parts and the linearly mobile arrangement of parts for successively ejecting bottles from the former and directing them toward the latter.

The foregoing abstract is neither intended to define the invention disclosed in the specification, nor is it intended to limit the scope of the invention in any way.

24 Claims, 6 Drawing Figures

BOTTLE-CONVEYING APPARATUS

BACKGROUND OF THE INVENTION

The present invention relates generally to bottle-handling and processing apparatus, and more particularly to apparatus for inverting, selectively, certain bottles, and conveying such bottles in a uniformly upright condition.

The present invention is concerned with the logistics of effecting the rapid transfer of an advancing random train of open end leading and closed end leading bottles from apparatus for inverting, selectively, those bottles having an open end leading disposition into a closed end leading disposition to apparatus for conveying the bottles in a uniformly upright and stabilized condition for further processing, such as cleaning, filling, packaging and storing, etc.

The prior art includes numerous disclosures of apparatus for selectively inverting certain bottles of an advancing array of bottles to provide a train of uniformly oriented bottles. The prior art also includes numerous disclosures of apparatus for conveying bottles from one location to another for purposes of cleaning, filling, packaging, or other processing. There appear to be very few disclosures in the prior art, however, directed to apparatus that can effectively, reliably and at high speed successively remove bottles from bottle-inverting apparatus and deposit such bottles in a stabilized condition on bottle-conveying apparatus that cooperates with various subsequent bottle-processing equipment.

There also appears to be a dearth of prior art directed to apparatus that can remove bottles from bottle-inverting apparatus at a sufficiently high rate so as to reliably prevent interference between bottles being removed from the bottle-inverting apparatus and bottles being inverted by the bottle-inverting apparatus.

SUMMARY OF THE INVENTION

Accordingly, it is an object of the present invention to provide an improved bottle-inverting and bottle-conveying apparatus.

It is a further object of the present invention to provide such apparatus that optimizes the effectiveness, reliability and rate of transfer of bottles from apparatus for selectively inverting bottles to apparatus for conveying the bottles to various bottle-processing equipment.

It is another object of the present invention to provide such apparatus that reliably prevents leading bottles being removed from bottle-inverting apparatus from interfering with trailing bottles being inverted or otherwise processed through such inverting apparatus during the removal of such bottles from the inverting apparatus and during the transfer of such bottles to bottle-conveying apparatus that cooperates with various subsequent bottle-processing equipment.

The present invention preferably comprises a rotationally mobile bottle-gripping means, for example, in the form of a pair of flexible, spaced discs, for frictionally gripping the opposite sides of each of a plurality of bottles advancing thereto in succession and rotatably advancing such bottles in a downstream direction to a linearly mobile bottle-gripping means. The latter said means may include, for example, a pair of endless side belts for frictionally gripping the opposite sides of the bottles advanced thereto in succession and substantially linearly advancing such bottles further downstream to, for example, certain bottle-processing equipment. A bottle ejection means interposed between the rotationally mobile bottle-gripping means and the linearly mobile bottle-gripping means is also provided for successively ejecting bottles from the former, and means is provided for directing such bottles toward the latter. The bottle ejection means may include a camming member positioned between the aforesaid flexible spaced discs.

A linearly mobile platform means, for example, in the form of an endless belt, may be positioned below the side belts of the linearly mobile bottle-gripping means so as to provide a horizontally moving support for the bottles being advanced by the side belts.

The rotationally mobile bottle-gripping means may, for example, be associated with a pivotal hook-like member for selectively inverting bottles advanced thereto having an open end leading disposition to a closed end leading disposition.

BRIEF DESCRIPTION OF THE DRAWINGS

While the specification concludes with claims which particularly point out and distinctly claim the subject matter regarded as the invention herein, it is believed that the invention will be better understood from the following description thereof taken in conjunction with the accompanying drawings, in which:

DETAILED DESCRIPTION OF THE INVENTION

Figure 1:
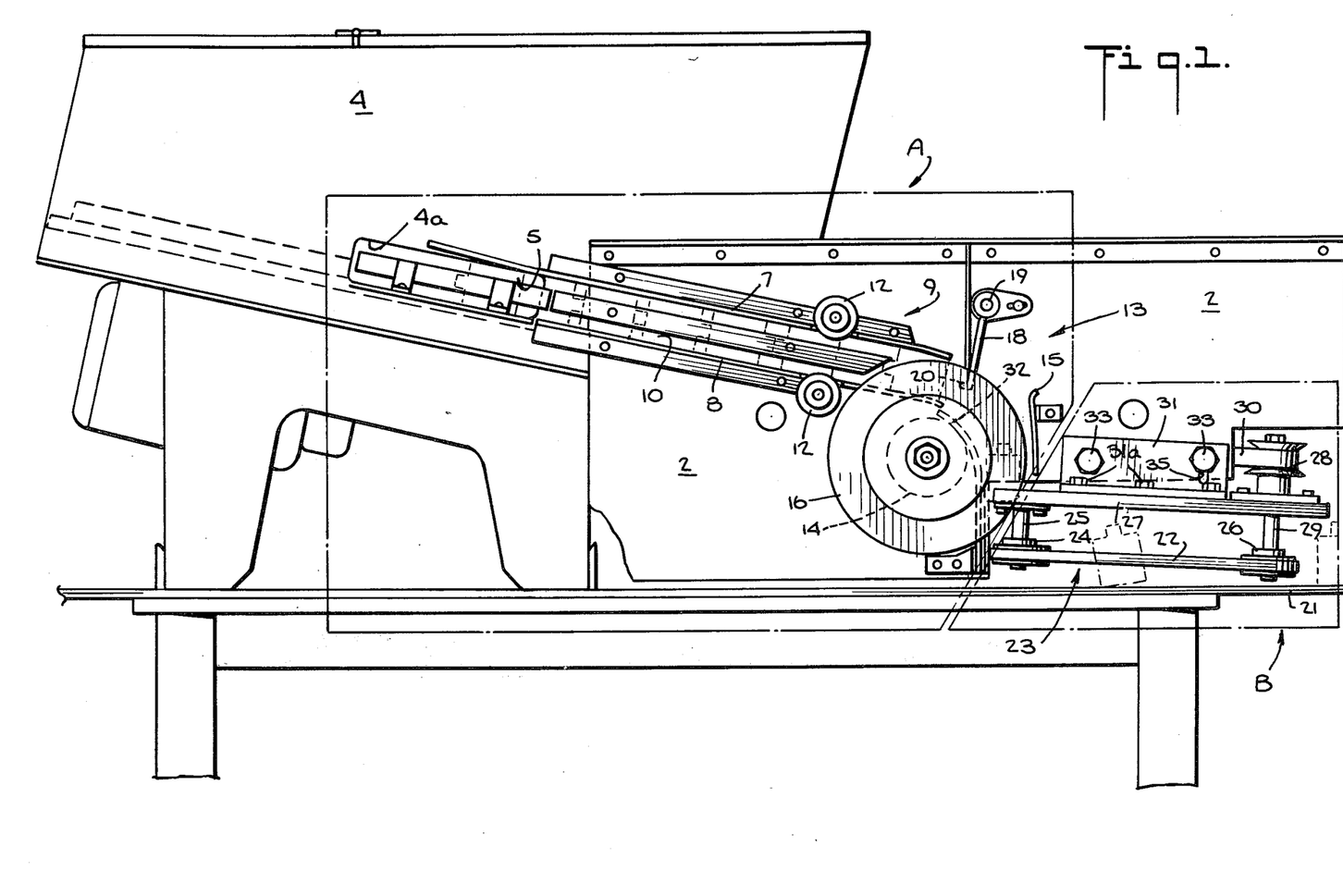
FIG. 1 is a fragmentary, schematic, side elevational view of apparatus pursuant to one embodiment of the present invention.

Referring now to the drawings wherein like numbers are used to denote like parts in the various views, and particularly to FIG. 1, there is illustrated a bottle-inverting unit within the region surrounded by the broken line denoted by the reference character A, and a bottle-conveying unit within the region surrounded by the broken line denoted generally by the reference character B. The bottle-inverting unit A includes a vertically arranged frame 2 upon which is secured a bottle-containing or supply unit 4. The supply unit 4 may be, for example, a conventional tank-like device for containing a large number of plastic bottles randomly predisposed therein, for example, by hand. The unit 4 is equipped with appropriate conventional mechanism (not shown) for discharging the bottles in succesion, one-by-one, through an opening 4a and into a chute or conduit 5. The unit 4 may be, for example, of the type which utilizes a rotating cone or plate (not shown) to discharge the bottles in succession, under slight pressure, into the chute 5. A typical version of the unit 4 is, for example, sold under the registered trademark CENTRIFEED by the firm Tangen Drives, Inc. of Clearwater, Fla.

Figure 5:
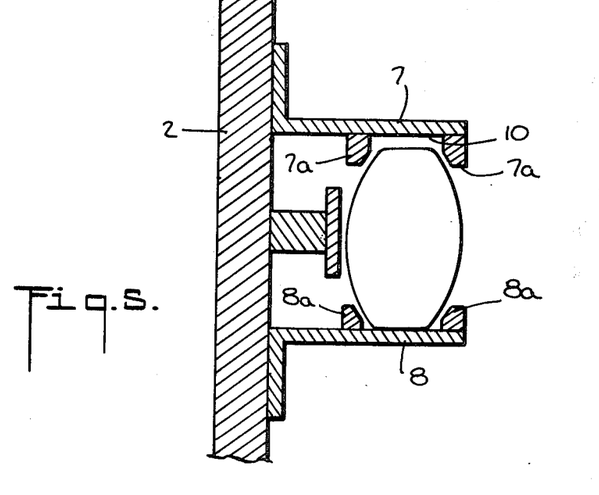
FIG. 5 is an enlarged sectional view, taken along the line 5—5 of FIG. 4.

Communicating with the chute 5 of the unit 4 is a chute or conduit 10 defined by an elongate upper plate member 7 and an elongate lower plate member 8. The members 7 and 8 are secured to one side face of the frame 2 and are spaced from one another such that the conduit 10 defined therebetween has substantially the same dimensions as the chute or conduit 5 with which the unit 4 directly communicates. The conduits 5 and 10 are, thus, substantially identical, and are adapted to guide the advancement of bottles discharged from the unit 4 endwise, in succession, in at-random open end leading and open end trailing dispositions. The elongate members 7 and 8 may be provided with appropriate flanges or lips 7a and 8a (FIG. 5), respectively, which prevent inadvertent lateral displacement of the advancing bottles discharged from the unit 4.

Figure 6:
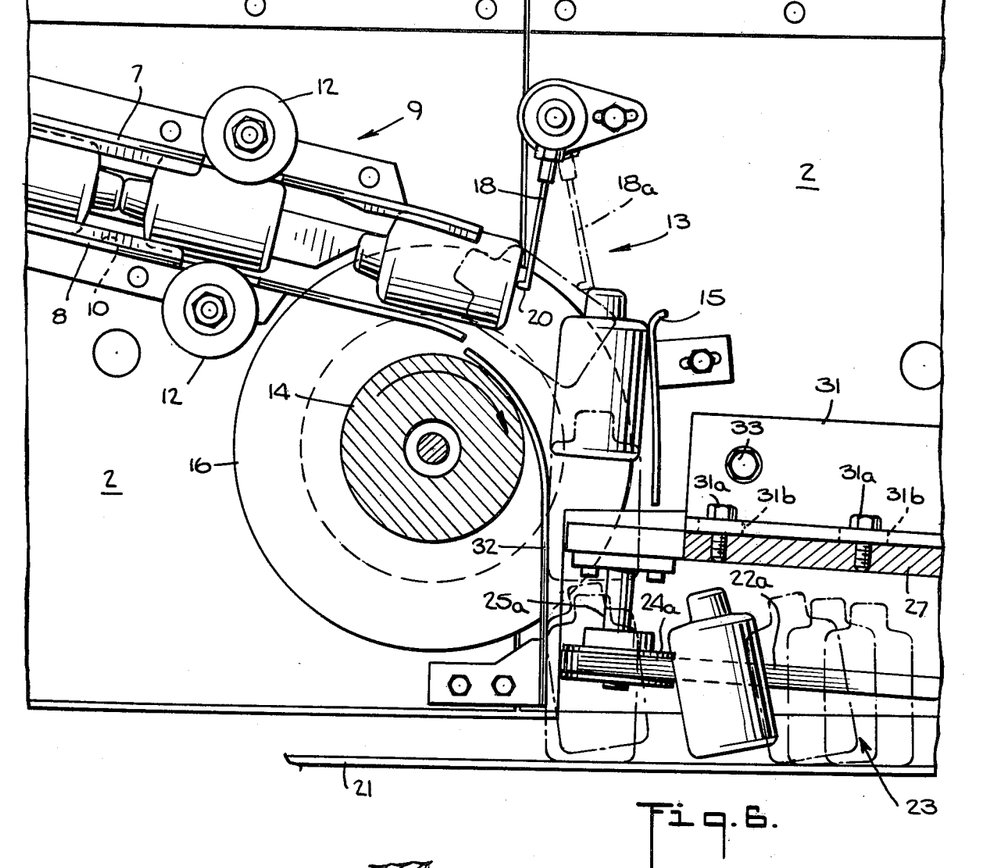
FIG. 6 is a view similar to FIG. 5 illustrating the various positions assumed by a closed end leading bottle which arrives at and passes through the apparatus of the present invention.

Associated with the conduit or chute 10 is a pair of timing rollers (FIGS. 1, 4 and 6) each roller of which is denoted by the reference character 12. The assembly of the timing rollers 12 and the chute 10 constitutes a guide means, shown generally at 9, for receiving and advancing the bottles discharged from the conduit 5. The timing rollers 12 function to control the rate of advancement of the bottles outwardly of the conduit 5 and into a discriminating means, shown generally at 13, for distinguishing bottles of open end leading disposition from bottles of open end trailing disposition and altering the disposition of each of the open end leading disposition bottles to respective open end trailing disposition bottles as the bottles move through the discriminating means.

The discriminating means 13 includes a dual-disc roller 14 which receives the bottles from conduit 5. The roller 14 is rotatably mounted on frame 2 and is preferably comprised of a pair of flexible discs 16, for example made of an elastomeric material such as rubber, that are axially spaced from one another by a distance corresponding to but slightly less than the width of the bottles advanced thereto by the timing rollers 12. In particular, the timing rollers 12 rotate in opposite directions so as to cooperate with one another and frictionally advance bottles at a prescribed rate to the discs 16 of the roller 14. The discs 16, on the other hand, rotate in unison with one another in a generally clockwise direction (with respect to FIG. 1), and are adapted to initially frictionally grip and accelerate the leading end portion (and subsequently, the remainder) of each bottle advanced thereto by the timing rollers 12. As such, the clockwise rotation of the discs 16 effects movement of each bottle gripped thereby toward a lever 18 pivotally connected at one end portion 19 to the frame 2 and lightly spring-biased in a clockwise direction to rest against a stop (not shown) in the position illustrated in FIG. 1. The opposite end 20 of the lever 18 is generally hook-shaped and interposed in spaced relation between the discs 16 at an appropriate location for being engaged by the leading end of each bottle advanced thereto by the discs 16.

The drive means associated with the timing rollers 12 and the roller 14, and the arrangement of parts associated with the lever 18 for maintaining the lever 18 in a disposition of preferred angularity relative to the frame 2 between the discs 16 may, for example, be of the type disclosed in copending U.S. Patent application Ser. No. 763,906, filed on Jan. 31, 1977, and assigned to New England Machinery, Inc., the assignee of the present invention. Said U.S. Patent application Ser. No. 763,906 is hereby incorporated by reference herein in its entirety.

Figure 4:
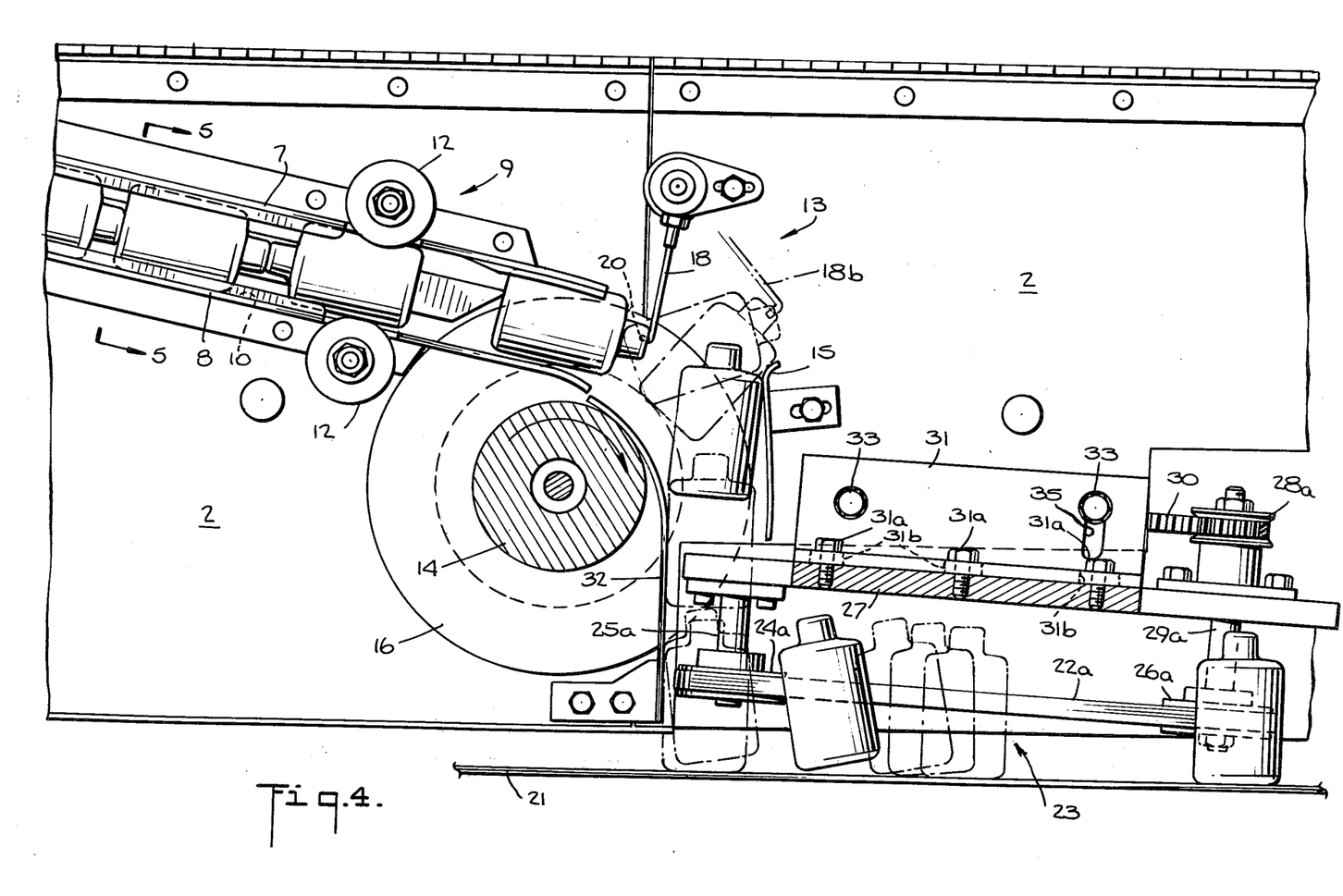
FIG. 4 is an enlarged view similar to FIG. 1, with parts cut away for clarity, showing the various positions assumed by an open end leading bottle which arrives at and passes through the bottle-inverting apparatus and bottle-conveying apparatus of this invention.

In a manner as disclosed in the aforementioned U.S. Patent application, the discs 16 of the roller 14 advance each bottle in succession to the lever 18. If the bottle advanced to the lever 18 has a closed end leading disposition, such closed end of the bottle contacts the hook-shaped end portion 20 of the lever 18 causing it to pivot generally counterclockwise to the position shown at 18a in FIG. 6, out of operative association with such bottle, and the bottle passes through the discriminating means 13 without inverting. If, on the other hand, the bottle advanced to the lever 18 has an open end leading disposition, as shown in FIG. 4, the hook-shaped end portion 20 of the lever 18 will act to grip the open end of such bottle, and will pivot counterclockwise to the position shown at 18b in FIG. 4 as the remainder of the bottle gripped by the discs 16 is advanced in a generally clockwise direction. However, since the hook-shaped portion 20 of the lever 18 is engaged with the open end of the bottle, the bottle will start to invert or pivot relative to the discs 16 in a generally counterclockwise direction until the trailing closed end thereof moves in advance of the hook-shaped portion 20 of the lever 18. This eventually allows the open end of the bottle which initially engaged the hook-shaped end portion 20 to be disengaged from the end portion 20. This occurs when the hook 20 clears the lip of the bottle with which it is engaged allowing the bias spring of lever 18 to return the lever to its starting position. During the foregoing operation, the continued clockwise rotation of the discs 16 also causes the open end portion of the partially inverted bottle to contact cam 15 and be cammed toward discs 16, completing the inversion of the bottle.

In this manner, those bottles having a closed end leading disposition remain unaltered by the lever 18, whereas those bottles having an open end leading disposition are effectively inverted by the cooperation of the lever 18 and cam 15 with the discs 16. Such inversion on a selective basis of those bottles having an open end leading disposition results in the formation of a train of bottles each having a uniform closed end leading disposition downstream of the lever 18 and cam 15.

The bottle-conveying unit B includes a platform-acting, conveyor belt 21 and a bottle stabilizing means, shown generally at 23. Conveyor belt 21 is disposed below a pair of endless side belts 22, 22a (FIGS. 1 and 2) of the bottle stabilizing means 23. The conveyor belt 21 is supported and driven by conventional means (not shown), whereas the endless side belts 22 and 22a are each associated with a respective pair of pulleys 24, 26 and 24a, 26a. The belts 22 and 22a may either have multiple longitudinal "V"-shaped ribs and grooves (not shown) on their interior surfaces to cooperate with mating ribs and grooves (not shown) on the pulleys 24, 26, 24a and 26a or they may have transverse teeth 22b and 22c (FIG. 2) on their inner surfaces to cooperate with mating transverse grooves (not shown) on the pulleys. The pulley 24 (24a) is preferably an idler pulley that is freely journaled on a substantially vertically disposed shaft 25 (25a) projecting downwardly from a supporting bracket 27. On the other hand, the pulley 26 (26a) is fixedly associated with a rotatable shaft 29 (29a) that is rotatably driven by a drive system as discussed below.

Figure 2:
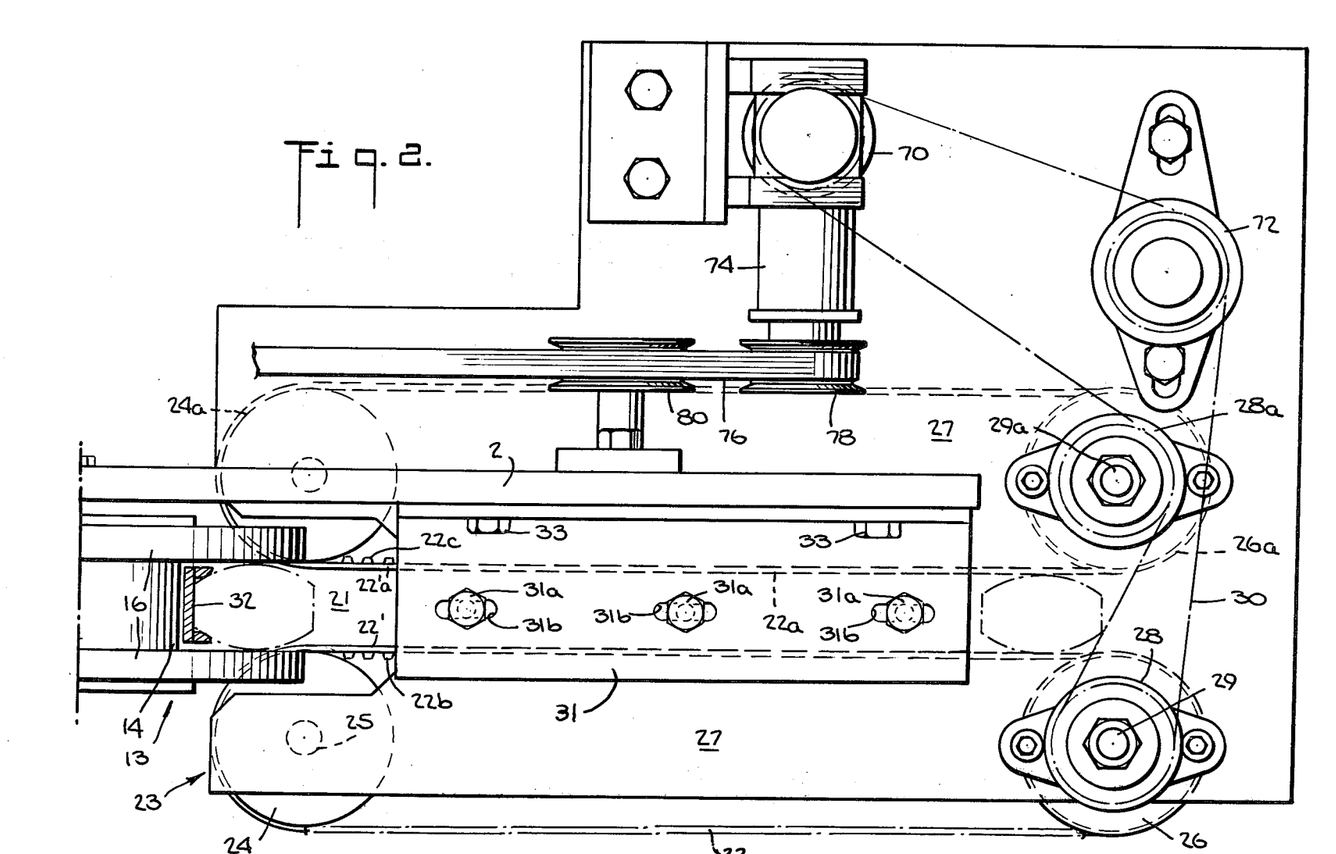
FIG. 2 is an enlarged, fragmentary, schematic, plan view of a preferred drive means of the present invention.

In this regard, reference is now made particularly to FIG. 2 of the drawings in which is illustrated the preferred drive system for the pulleys 24 and 26 associated with the side belt 22, and the pulleys 24a and 26a associated with the side belt 22a. In particular, operatively associated with the pulley 26 via the shaft 29 is a driven pulley 28, and operatively associated with the pulley 26a through the intermediary of a shaft 29a similar to the shaft 29 is a driven pulley 28a. The pulleys 28 and 28a each have an outer toothed surface and are commonly driven by a single endless band 30 that is associated with a driver pulley 70. The pulley 70 and band 30 also have toothed surfaces corresponding to that of the pulleys 28 and 28a. In particular, the band 30 has teeth on each of its opposite sides.

The endless band 30 is held in a taut condition by means of a toothed, idler, tension roller 72. The endless band 30 is associated with the driven pulleys 28 and 28a so as to effect rotation of such pulleys in relative opposite directions. In this regard, for example, the pulley 28 is driven in a clockwise direction (relative to FIG. 2), whereas the pulley 28a is driven in a counterclockwise direction. In turn, the pulleys 26 and 26a associated with the pulleys 28 and 28a, respectively, are rotationally driven in opposite directions so as to transmit movement to the runs of the endless belts 22 and 22a similarly in opposite directions. As a result, the inner runs 22' and 22a' of the endless belts 22 and 22a, respectively, are driven in the same direction, to the right in FIG. 2.

With respect to the driver pulley 70, the latter is preferably, though not necessarily, associated with, for example, a right angle drive unit 74. The right angle drive unit 74 is, for example, powered by an endless belt 76 coupled with an input pulley 78 of the right angle drive unit 74 and with an appropriate variable speed drive mechanism of conventional nature (not shown). A tension, idler, pulley 80 may, for example, be associated with one of the runs of the endless belt 76 so as to impart to the latter an appropriate controlled tension.

Referring once again to FIGS. 1, 4 and 6, the entire drive system (illustrated in FIG. 2) for powering the side belts 22, 22a is mounted upon the aforementioned bracket 27. Such bracket 27 is longitudinally adjustably bolted to an angle bracket 31 by means of bolts 31a which pass through slots 31b formed in bracket 31. Bracket 31 is affixed to the frame 2 by means of a pair of bolts 33. The right-most bolt 33 is associated with a slot 35 formed in the vertically disposed portion of bracket 31 so as to enable such bracket 31 to pivot about the left-most bolt 33 downwardly from a generally horizontal disposition to a slightly inclined disposition relative to the upper run of the conveyor belt 21. As a result, the side belts 22, 22a may be selectively arranged with an inclination in a downstream direction (to the right) relative to the conveyor belt 21, the upper run of which belt 21 moves likewise to the right in a downstream direction. Also, as a result of the aforementioned bolts 31a and slots 31b, the belts 22 and 22a may be longitudinally adjusted toward or away from the discriminating means 13 to allow for "fine tuning" of the transfer of bottles therebetween, and to give a degree of flexibility with respect to the sizes of bottles that may be processed by the apparatus.

In the operation of the apparatus illustrated in FIGS. 1, 2, 4 and 6, bottles are discharged from the unit 4 into the chute 5 and then into the chute 10 for continued advancement by the timing rollers 12. The timing rollers 12, as discussed above, control the rate of advancement of such bottles endwise into engagement with the sides of the discs 16 of the roller 14. Once the discs 16 frictionally engage each such bottle advanced thereto, such discs 16 in the course of their clockwise rotation accelerate each bottle away from the timing rollers 12 and advance each bottle in succession into contact with the hook-shaped end portion 20 of the lever 18. If the bottle is one that is advancing with a closed end leading disposition, such closed end simply pushes the hook-shaped end portion 20 until the lever 18 turns sufficiently counterclockwise to be out of interference with such bottle.

If, on the other hand, the bottle is one that is advancing with an open end leading disposition, the hook-shaped end portion 20 acts to catch the open end of such bottle and cause the latter to pivot generally counterclockwise relative to the discs 16 until such discs 16 move the closed end trailing portion of the bottle to a position in advance of the initially open end leading portion of the bottle. Ultimately, the lever 18, cam 15 and discs 16 cooperate with the bottles in such a manner as to effect the inversion of each bottle that advances with an open end leading disposition into one having a closed end leading disposition, in the manner described earlier herein.

Accordingly, all of the bottles carried downstream of the lever 18 and cam 15 by the discs 16 ultimately have a closed end leading disposition and are advanced clockwise toward the bottle stabilizing means 23 of conveyor unit B. Continued rotation in a clockwise direction of the discs 16 effects the advancement of the bottles, now all in a uniform closed end leading disposition, toward a cam 32 which serves as a bottle ejection means for successively ejecting bottles from the discs 16 of the bottle inverting unit A. The bottles, after being ejected from the discs 16 by cam 32, move freely through space into bouncing contact with an upstream portion of conveyor belt 21, at a point where the belt is supported by the table or platform below it (see FIg. 1), whereupon the lower portions of the rebounding bottles are accelerated to the right, as viewed in FIGS. 4 and 6, due to their momentary contact with the moving conveyor 21. This assists the bottles in entering the upstream end (left end as viewed in FIGS. 4 and 6) of the bottle stabilizing means 13. Thus, this portion of conveyor belt 21 and the platform or table beneath it act as a means for directing ejected bottles toward the bottle stabilizing means 23. Accordingly, the side belts 22 and 22a frictionally engage and grip the sides of each ejected bottle and function to place stabilized bottles upon conveyor belt 21 in connection with the transfer of the bottles from the discriminating means 13 to the conveyor belt 21.

Because of the inclination of the side belts 22 and 22a relative to the conveyor belt 21, the side belts 22 and 22a cooperate with one another to advance each bottle gripped therebetween not merely in a generally horizontal direction, but also in a generally vertical direction. As a result, the side belts 22 and 22a cause each horizontally moving bottle gripped therebetween to also initially move downwardly into contact with the conveyor belt 21, under progressively increasing pressure limited by the vertical slippage between belts 22 and 22a and the bottles, thereby stabilizing the horizontal movement of each bottle in the course of its continued advancement downstream on conveyor belt 21.

It will be understood, of course, that the inner runs of the side belts 22 and 22a are each advanced at the same speed by the endless band 30 associated therewith, which speed corresponds to, or is the same as, the speed of the advancement of the horizontal conveyor belt 21 cooperating therewith. Thus, each bottle advanced by the cooperating side belts 22 and 22a and the conveyor belt 21 is placed into an erect, stable disposition upon the conveyor belt 21, so that when the bottles exit from the side belts 22 and 22a the conveyor belt 21 continues the advancement of each stabilized bottle in a downstream direction to appropriate bottle-processing equipment (not shown).

Figure 3:
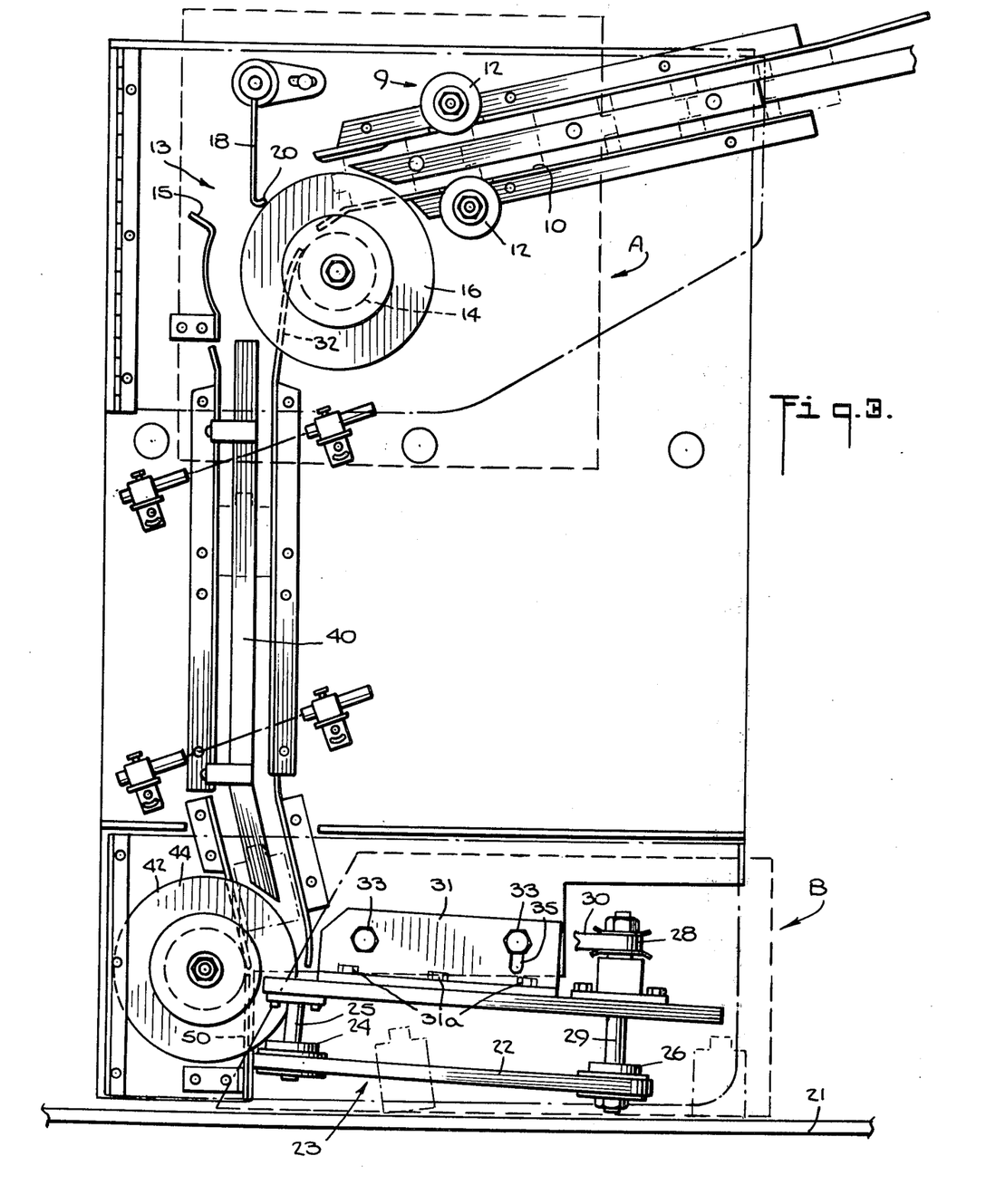
FIG. 3 is a view similar to FIG. 1 illustrating an alternate embodiment of the present invention.

With respect to the embodiment illustrated in FIG. 3, the latter is substantially identical to the embodiment of FIG. 1, the difference existing principally in the interposition between the bottle-inverting unit A and the bottle-conveying unit B of a vertically disposed chute 40, and the provision of a second dual-disc roller 42 having flexible discs 44 substantially identical to the roller 14 and the discs 16, respectively. In the embodiment of FIG. 3, the roller 14 is rotated counterclockwise and cooperates with the lever 18 and cam 15 to effect selective inversion of bottles having an open end leading disposition into bottles with a closed end leading disposition. Once such selective inversion is effected, all of the bottles fall in a uniform closed end leading disposition vertically downwardly through the chute 40 and into engagement with the opposite sides of the discs 44. The roller 42, and thus the discs 44, are rotated in a generally clockwise direction to effect rotational advancement of each bottle into engagement with a cam 50, which corresponds to the cam 32 in the FIG. 1 embodiment, to eject bottles from roller 42 onto conveyor 21 which directs such bottles into the side belts 22, 22a of the bottle-conveying unit B. The rotation of the roller 42 may be effected by any conventional means and is preferably at the same rate of rotation as the roller 14.

It will be understood that other than for the provision of the vertical chute 40 and the additional roller 42 with its discs 44, the embodiment of FIG. 3 operates substantially the same as that of the embodiment of FIG. 1. It will also be understood that the drive means illustrated in FIG. 2 as cooperating with the embodiment of FIG. 1, has an identical application with respect to the embodiment illustrated in FIG. 3.

Having thus set forth the nature of the present invention, it will be understood that the foregoing description of preferred embodiments of the present invention is for purposes of illustration only, and that the various structural and operational features and relationships herein disclosed are susceptible to a number of modifications and changes. For example, it is not necessary that the conveyor belt 21 be positioned beneath the ejection means cam 32 to assist in directing towards belts 22 and 22a bottles which have been removed from discs 16. In place of the conveyor belt 21 a platform, angled downwardly to the right away from cam 32, could be employed to give the freely bouncing bottles movement to the right, as viewed in FIGS. 1, 4 and 6. Similarly, instead of the downwardly angled platform just mentioned, a horizontal platform could be employed in place of conveyor belt 21, and the cam 32, instead of being essentially vertically disposed in its lower portion, could be angularly disposed with its lower portion farther to the right than shown in FIGS. 1, 4 and 6. This would also cause the bottles being ejected from the discs 16 to be directed to the right during their free fall from discs 16 and their rebound from the horizontal platform. In each of the foregoing two variations a conveying means would be provided at some point under the bottle stabilizing means 23 to receive the bottles therefrom. Accordingly, it is therefore aimed in the appended claims to cover all such changes and modifications as fall within the spirit and scope of this invention.

What is claimed is:

1. Bottle conveying apparatus comprising rotationally mobile bottle-gripping means for frictionally gripping the opposite sides of each of a plurality of bottles advancing thereto in succession and rotatably advancing such bottles in a downstream direction, linearly mobile bottle-gripping means downstream of said rotationally mobile bottle-gripping means for frictionally gripping the opposite sides of bottles advanced thereto in succession by said rotationally mobile bottle-gripping means and substantially linearly advancing such bottles away from said rotationally mobile bottle-gripping means; bottle ejection means interposed between said rotationally mobile bottle-gripping means and said linearly mobile bottle-gripping means for successively ejecting bottles from said rotationally mobile bottle-gripping means; and, means for directing said ejected bottles toward said linearly mobile bottle-gripping means.

2. Apparatus as claimed in claim 1 wherein said bottles ejected from said rotationally mobile bottle-gripping means by said ejection means and directed toward said linearly mobile bottle-gripping means by said directing means move freely through space during at least a portion of their movement from the rotationally mobile bottle-gripping means to the linearly mobile bottle-gripping means.

3. Apparatus as claimed in claim 2 wherein said bottle directing means includes linearly mobile platform means interposed between said bottle ejecting means and said linearly mobile bottle-gripping means, said linearly mobile platform means cooperating with said bottle ejection means in directing said bottles toward said linearly mobile bottle-gripping means.

4. Apparatus as claimed in claim 3 wherein said platform means is elongated and extends below said linearly mobile bottle-gripping means, said linearly mobile bottle-gripping means being included relative to said platform means and converging in a downstream direction toward the latter, said linearly mobile bottle-gripping means and said platform means being constructed and arranged so that bottles gripped by said linearly mobile bottle-gripping means are forced against said platform means during their engagement with said linearly mobile bottle-gripping means.

5. Apparatus as claimed in claim 4, wherein said linearly mobile bottle-gripping means includes a first endless belt, a first pair of pulleys operatively associated with said first endless belt for constraining the latter in taut relation, a second endless belt, a second pair of pulleys substantially coplanar with said first pair of pulleys and operatively associated with said second endless belt for constraining the latter in taut relation spaced horizontally from and parallel to said first endless belt, the confronting runs of said first and second endless belts being arranged to frictionally grip the opposite sides of bottles therebetween.

6. Apparatus as claimed in claim 5, including drive means for rotating at least one pulley of each of said pairs of pulleys and effecting simultaneous translation of the runs of each of said endless belts at the same speeds.

7. Apparatus as claimed in claim 6, wherein said rotationally mobile bottle-gripping means includes a pair of coaxial discs spaced axially from one another by a distance corresponding to the distance between said endless belts.

8. Apparatus as claimed in claim 7 wherein said bottle ejection means includes a cam positioned between said discs and having its upstream portion radially inwardly of its downstream portion relative to said discs.

9. Apparatus as claimed in claim 5, wherein said platform means includes a horizontal, linearly movable, belt run, and means for moving said belt run in said downstream direction.

10. Apparatus as claimed in claim 9, wherein said endless belts and said belt run of said platform means are operatively associated with one another such that said endless belts frictionally force each of said bottles axially against said belt run, with gradually increasing pressure until said bottles frictionally slip substantially axially, as said bottles are moved laterally downstream.

11. Apparatus as claimed in claim 1, including bottle-discriminating means for altering the disposition of bottles advancing thereto in an open end leading disposition to an open end trailing disposition.

12. Apparatus as claimed in claim 11, wherein said bottle-discriminating means includes a pair of coaxial discs spaced axially from one another by a distance which is slightly less than the width of a bottle and further includes a pivotally supported hook-like member disposed in spaced relation between said discs at a location at which said hook-like member can catch the open end of those of said bottles having an open end leading disposition to effect inversion of such bottles upstream of said endless belts.

13. Apparatus as claimed in claim 6, wherein said drive means includes a first driven pulley operatively associated with one pulley of said first pair of pulleys, a second driven pulley operatively associated with one pulley of said second pair of pulleys, a drive pulley operatively associated with said first and second driven pulleys, and an endless belt interconnecting said drive pulley with said first and second driven pulleys.

14. Apparatus as claimed in claim 13, wherein the latter said endless belt has opposite toothed sides, and said drive pulley and said first and second driven pulleys have toothed peripheries corresponding to the teeth on the latter said endless belt.

15. Apparatus as claimed in claim 14, wherein the latter said endless belt is operatively associated with said first and second driven pulleys in such a manner that said first driven pulley turns in a direction opposite of the direction in which said second driven pulley turns.

16. Apparatus as described in claim 12 wherein said discs, in addition to forming a part of said bottle discriminating means, also serve as a part of said rotationally mobile bottle-gripping means.

17. Apparatus as described in claim 12, said rotationally mobile bottle-gripping means including a second pair of concentric discs spaced axially from one another by a distance corresponding to the width of a bottle, said second pair of discs being positioned at a level below said first pair of discs, and further including chute means interconnecting said first pair of discs with said second pair of discs for guiding said open end trailing bottles from said discriminating means to said rotationally mobile bottle-gripping means.

18. Bottle conveying apparatus comprising rotary conveying means constructed and arranged to carry through at least a portion of the circumferential extent thereof a succession of oriented bottles, each of said bottles having an open end trailing disposition in said portion of said rotary conveying means; linear conveying means downstream of said rotary conveying means and disposed in a generally horizontal plane for receiving said succession of bottles in open end up dispositions; bottle stabilizing means positioned above an upstream portion of said linear conveying means and coextensive with at least a portion of said linear conveying means in a downstream direction for stabilizing on said linear conveying means the bottles being received thereon; means interposed between said rotary conveying means and said bottle stabilizing means for ejecting bottles from said rotary conveying means; and, means for directing said ejected bottles toward said bottle stabilizing means.

19. Apparatus as described in claim 18, wherein said bottle ejecting means and said rotary conveying means are so constructed and arranged relative to said bottle stabilizing means that said bottles fall freely through space during a portion of their movement from said rotary conveying means to said bottle stabilizing means.

20. Apparatus as described in claim 19 wherein said means for directing ejected bottles toward said bottle stabilizing means comprises a further upstream portion of said linear conveying means, said further upstream portion of said linear conveying means being positioned in the path of said falling bottles, said falling bottles rebounding from said further upstream portion of said linear conveying means with a horizontal component of movement added thereto.

21. Apparatus as described in claim 19 wherein said rotary conveying means includes a pair of flexible, elastomeric, coaxial discs constructed and arranged to rotate about a horizontal axis, said discs being spaced axially from one another by a distance which is slightly less than the width of one of said bottles.

22. Apparatus as described in claim 21 wherein said bottle ejection means includes a cam positioned between said discs, said cam having its upstream portion radially inwardly of its downstream portion relative to said discs.

23. Apparatus as described in claim 18 wherein said bottle stabilizing means includes linearly mobile bottle-gripping means inclined relative to said linear conveying means and convering in a downstream direction therewith.

24. The apparatus as claimed in claim 2, wherein said bottle ejection means is constructed and arranged so that each bottle ejected from said rotationally mobile bottle-gripping means moves freely through space in substantially open-end trailing disposition to said directing means, and said directing means is constructed and arranged to direct each such bottle freely through space toward said linearly mobile bottle-gripping means by accelerating each such bottle in a direction generally perpendicular to its axis.

* * * * *

UNITED STATES PATENT AND TRADEMARK OFFICE
CERTIFICATE OF CORRECTION

PATENT NO. : 4,148,390
DATED : April 10, 1979
INVENTOR(S) : Alexandru D. Ionescu It is certified that error appears in the above–identified patent and that said Letters Patent are hereby corrected as shown below:

In column 8, line 47 the word "included" should read --inclined--.

*Signed and Sealed this*

*Thirty-first* Day of *July 1979*

[SEAL]

*Attest:*

*Attesting Officer*

LUTRELLE F. PARKER
*Acting Commissioner of Patents and Trademarks*